(12) United States Patent
Rozenbaum et al.

(10) Patent No.: US 12,231,401 B2
(45) Date of Patent: Feb. 18, 2025

(54) EFFICIENT AND FLEXIBLE FLOW INSPECTOR

(71) Applicant: MELLANOX TECHNOLOGIES, LTD., Yokneam (IL)

(72) Inventors: Chen Rozenbaum, Beer Yakov (IL); Shaul Arazi, Tel Aviv (IL); Shahaf Shuler, Kibbutz Lohamei Hagetaot (IL); Gary Mataev, Haifa (IL)

(73) Assignee: Mellanox Technologies, Ltd, Yokneam (IL)

( * ) Notice: Subject to any disclaimer, the term of this patent is extended or adjusted under 35 U.S.C. 154(b) by 265 days.

(21) Appl. No.: 17/714,207

(22) Filed: Apr. 6, 2022

(65) Prior Publication Data

US 2023/0328032 A1     Oct. 12, 2023

(51) Int. Cl.
*H04L 9/40*     (2022.01)
*H04L 69/22*    (2022.01)

(52) U.S. Cl.
CPC ...... *H04L 63/0236* (2013.01); *H04L 63/0263* (2013.01); *H04L 63/20* (2013.01); *H04L 69/22* (2013.01)

(58) Field of Classification Search
CPC . H04L 63/0236; H04L 63/0263; H04L 63/20; H04L 69/22
USPC .......................................................... 726/11
See application file for complete search history.

(56) References Cited

U.S. PATENT DOCUMENTS

| | | | |
|---|---|---|---|
| 5,347,637 A | 9/1994 | Halford | |
| 6,041,058 A | 3/2000 | Flanders et al. | |
| 6,704,831 B1 | 3/2004 | Avery | |
| 7,286,549 B2 | 10/2007 | Gaur | |
| 7,346,707 B1 | 3/2008 | Erimli | |
| 7,535,907 B2 | 5/2009 | Hussain et al. | |
| 7,813,277 B2 | 10/2010 | Okholm et al. | |
| 7,895,431 B2 | 2/2011 | Bouchard et al. | |
| 8,095,683 B2 | 1/2012 | Balasubramaniam Chandra | |

(Continued)

FOREIGN PATENT DOCUMENTS

CN     1529256 A     9/2004

OTHER PUBLICATIONS

Tsirkin et al., "Virtual I/O Device (VIRTIO)", Version 1.1, OASIS Open Committee Specification 01, pp. 1-126, Apr. 11, 2019 as downloaded from https://docs.oasis-open.org/virtio/virtio/v1.1/virtio-v1.1.html.

(Continued)

*Primary Examiner* — Kambiz Zand
*Assistant Examiner* — Phuc Pham
(74) *Attorney, Agent, or Firm* — Meitar Patents Ltd.; Daniel Kligler

(57) ABSTRACT

In one embodiment, a data communication device includes a network interface controller to process packets received from at least one of a host device for sending over a network, and at least one remote device over the network, at least one processor to execute computer instructions to receive a configuration, and extract filtering rules from the configuration, and at least one hardware accelerator to receive the filtering rules from the at least one processor, and filter the packets based on the rules so that some of the packets are dropped and some of the packets are forwarded to the at least one processor to send data based on the forwarded packets to another device.

21 Claims, 2 Drawing Sheets

(56) References Cited

U.S. PATENT DOCUMENTS

| | | |
|---|---|---|
| 8,111,707 B2 | 2/2012 | Riddle et al. |
| 8,208,380 B1 | 6/2012 | Nachum et al. |
| 8,279,885 B2 | 10/2012 | Riddle |
| 8,913,264 B2 | 12/2014 | Skvirski |
| 9,141,548 B2 | 9/2015 | Asher et al. |
| 9,397,938 B2 | 7/2016 | Folsom et al. |
| 9,680,742 B2 | 6/2017 | Tompkins et al. |
| 9,811,467 B2 | 11/2017 | Snyder, II et al. |
| 10,033,607 B2 | 7/2018 | Badea et al. |
| 10,210,125 B2 | 2/2019 | Burstein |
| 10,230,810 B1 | 3/2019 | Bhide et al. |
| 10,277,518 B1 | 4/2019 | Matthews et al. |
| 10,834,006 B2 | 11/2020 | Levy et al. |
| 10,999,366 B2 | 5/2021 | Gafni et al. |
| 11,327,890 B1 | 5/2022 | Mukherjee |
| 11,374,872 B1 | 6/2022 | Danivas et al. |
| 11,451,493 B2 | 9/2022 | Yefet et al. |
| 11,513,958 B1 | 11/2022 | Mukherjee |
| 2001/0055274 A1 | 12/2001 | Hegge et al. |
| 2004/0003094 A1 | 1/2004 | See |
| 2006/0056406 A1 | 3/2006 | Bouchard et al. |
| 2006/0265561 A1 | 11/2006 | Boyd et al. |
| 2007/0223385 A1 | 9/2007 | Berly et al. |
| 2008/0279102 A1 | 11/2008 | Sankaran et al. |
| 2009/0161547 A1 | 6/2009 | Riddle et al. |
| 2013/0258858 A1 | 10/2013 | Cherian et al. |
| 2014/0078915 A1 | 3/2014 | Edsall et al. |
| 2014/0089450 A1 | 3/2014 | Raindel et al. |
| 2014/0223111 A1 | 8/2014 | Dinkjian et al. |
| 2014/0280674 A1 | 9/2014 | Arramreddy et al. |
| 2014/0286352 A1* | 9/2014 | Turgeman ............... H04L 45/00 370/428 |
| 2014/0344536 A1 | 11/2014 | Benisty et al. |
| 2015/0071079 A1* | 3/2015 | Kadosh ................... H04L 45/04 370/237 |
| 2015/0134875 A1 | 5/2015 | Veal |
| 2015/0220360 A1 | 8/2015 | Snyder, II et al. |
| 2015/0249604 A1 | 9/2015 | Foslom et al. |
| 2015/0254104 A1 | 9/2015 | Kessler et al. |
| 2015/0355883 A1 | 12/2015 | Kegel |
| 2016/0087916 A1 | 3/2016 | Janardhanan |
| 2017/0104642 A1 | 4/2017 | Miura et al. |
| 2017/0279817 A1 | 9/2017 | Campbell et al. |
| 2017/0337010 A1 | 11/2017 | Kriss et al. |
| 2017/0339074 A1 | 11/2017 | Melman et al. |
| 2018/0123933 A1 | 5/2018 | Yamashima et al. |
| 2018/0183733 A1 | 6/2018 | Dcruz et al. |
| 2019/0327190 A1* | 10/2019 | Browne ............... H04L 49/3063 |
| 2019/0334799 A1* | 10/2019 | Iizuka ................. H04L 43/0823 |
| 2020/0106740 A1 | 4/2020 | Bangalore Krishnamurthy |
| 2020/0371708 A1 | 11/2020 | Karmani et al. |

OTHER PUBLICATIONS

NVM Express Inc., "NVM Express® Base Specification", Revision 2.0b, pp. 1-455, Jan. 6, 2022 as downloaded from https://nvmexpress.org/wp-content/uploads/NVM-Express-Base-Specification-2.0b-2021.12.18-Ratified.pdf.

PCI-SIG, "Pci Express® Base Specification", Revision 6.0, pp. 1-1923, Dec. 16, 2021.

U.S. Appl. No. 17/015,123 Office Action dated Mar. 16, 2022.

CN Application # 202010419130.4 Office Action dated Feb. 29, 2024.

Wikipedia, "Direct Memory Access," pp. 1-7, last edited Nov. 4, 2018.

U.S. Appl. No. 17/015,123 Office Action dated Sep. 14, 2022.

* cited by examiner

EFFICIENT AND FLEXIBLE FLOW INSPECTOR

FIELD OF THE INVENTION

The present invention relates to computer networks, and in particular, but not exclusively to, flow inspection.

BACKGROUND

Traffic inspection and filtering are fundamentals of any network topology and form the basis for network and cyber security-based solutions. Traffic filtering is used to provide network security by filtering network traffic based on different matching rules. Traffic filters are used to protect different services on a variety of network topologies and are used by many security companies.

SUMMARY

There is provided in accordance with an embodiment of the present disclosure, a data communication device, including a network interface controller to process packets received from at least one of a host device for sending over a network, and at least one remote device over the network, at least one processor to execute computer instructions to receive a configuration, and extract filtering rules from the configuration, and at least one hardware accelerator to receive the filtering rules from the at least one processor, and filter the packets based on the rules so that some of the packets are dropped and some of the packets are forwarded to the at least one processor to send data based on the forwarded packets to another device.

Further in accordance with an embodiment of the present disclosure, the device includes a data processing unit (DPU) including the network interface controller, the at least one processor, and the at least one hardware accelerator.

Still further in accordance with an embodiment of the present disclosure the computer instructions include instructions to extract a format from the configuration, format the data based on the extracted format, and send the formatted data to the other device.

Additionally in accordance with an embodiment of the present disclosure the computer instructions include instructions to parse headers of the forwarded packets, and format the data based on the extracted format and the parsed headers.

Moreover, in accordance with an embodiment of the present disclosure the other device is any one or more of the following a telemetry device, a device including a graphics processing unit (GPU), and a programmable device.

Further in accordance with an embodiment of the present disclosure the network interface controller includes packet processing circuitry to receive steering rules from the other device, and process other packets responsively to the steering rules.

Still further in accordance with an embodiment of the present disclosure the packet processing circuitry is configured to drop at least some of the other packets responsively to the steering rules.

Additionally in accordance with an embodiment of the present disclosure the computer instructions include instructions to send the data to the other device over the network.

Moreover, in accordance with an embodiment of the present disclosure the network interface controller includes packet processing circuitry to mirror the packets to the software including the computer instructions.

Further in accordance with an embodiment of the present disclosure the at least one hardware accelerator is configured to filter the packets responsively to any one or more of the following a 5-tuple identification, a tenant identification, a port identification, a user identification, and at least one field from a network header.

There is also provided in accordance with another embodiment of the present disclosure, a flow inspection method, including processing packets received from at least one of a host device for sending over a network, and at least one remote device over the network, receiving a configuration, extracting filtering rules from the configuration, receiving the filtering rules by at least one accelerator, and filtering the packets by the at least one accelerator based on the rules so that some of the packets are dropped and some of the packets are forwarded to at least one processor to send data based on the forwarded packets to another device.

Still further in accordance with an embodiment of the present disclosure, the method includes extracting a format from the configuration, formatting the data based on the extracted format, and sending the formatted data to the other device.

Additionally in accordance with an embodiment of the present disclosure, the method includes parsing headers of the forwarded packets, wherein the formatting includes formatting the data based on the extracted format and the parsed headers.

Moreover, in accordance with an embodiment of the present disclosure the other device is any one or more of the following a telemetry device, a device including a graphics processing unit (GPU), and a programmable device.

Further in accordance with an embodiment of the present disclosure, the method includes receiving steering rules from the other device, and processing other packets responsively to the steering rules.

Still further in accordance with an embodiment of the present disclosure, the method includes dropping at least some of the other packets responsively to the steering rules.

Additionally in accordance with an embodiment of the present disclosure, the method includes sending the data to the other device over the network.

Moreover, in accordance with an embodiment of the present disclosure, the method includes mirroring the packets to software.

Further in accordance with an embodiment of the present disclosure the filtering includes filter packets responsively to any one or more of the following a 5-tuple identification, a tenant identification, a port identification, a user identification, and at least one field from a network header.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
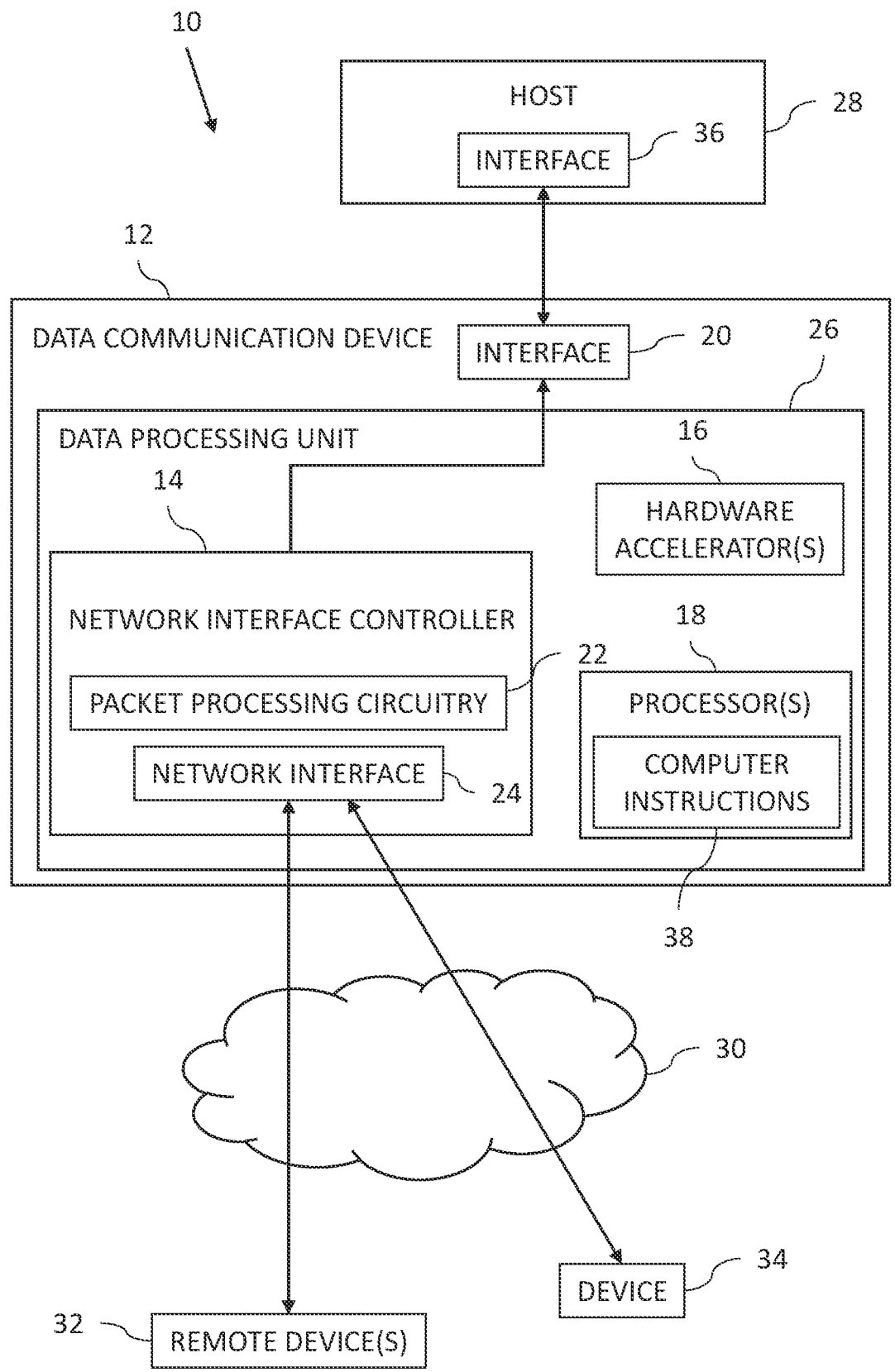
FIG. 1 is a block diagram view of a flow inspection system constructed and operative in accordance with an embodiment of the present invention.

As previously mentioned, traffic inspection and filtering are fundamentals of any network topology and form the basis for network and cyber security-based solutions. Traffic filtering is used to provide network security by filtering network traffic based on different matching rules. Traffic filters are used to protect different services on a variety of network topologies and are used by many security companies.

Traffic inspection and filtering may be implemented using a software-based solution. However, a software-based solution leads to low performance compared to hardware-based solutions. Although performing traffic inspection and filtering using dedicated hardware generally has higher performance than software, using dedicated hardware is inflexible and it is very hard, if not impossible, to add new features, such as new filtering schemes or data output formats used by security services.

Embodiments of the present invention solve at least some of the above problems by providing a data communication device with a traffic inspection and filtering sub-system, which includes a hybrid hardware and software solution providing both high performance and flexible traffic inspection and filtering. The software (which may include firmware) receives a configuration (e.g., in a configuration file) and extracts filtering rules from the configuration. The filtering rules are then provided to one or more hardware accelerators, which receive the filtering rules and filter packets according to the filtering rules so that some of the packets are dropped and some of the packets are forwarded to the software, which formats data based on the forwarded packets and sends the data to another device for processing such as a telemetry device, a programmable device, or a device including a graphics processing unit (GPU), etc. The software provides flexibility regarding the filtering rules, while the hardware accelerator(s) provide high performance filtering according to the filtering rules provided by the configuration.

In some embodiments, the software extracts a format from the configuration with which to format the data for sending to the other device. In some embodiments, the software parses headers of the forwarded packets and formats the data based on the extracted format and the parsed headers. Including the format in the configuration allows the data formatting to remain flexible and be tailored according to the needs of the security service (or other service) receiving the formatted data.

In some embodiments, the data communication device includes a data processing unit (DPU) which includes a network interface controller to process receipt and sending of packets over a network, one or more processors (e.g., processor cores), and one or more hardware accelerators. Using the processor(s) and accelerator(s) to perform the filtering and data formatting allows the DPU to filter network flows without interrupting data streams being processed to and/or from a host device connected to the data communication device.

System Description

Reference is now made to FIG. 1, which is a block diagram view of a flow inspection system 10 constructed and operative in accordance with an embodiment of the present invention. The system 10 includes a data communication device 12, which includes a network interface controller (NIC) 14, one or more hardware accelerators 16, one or more processors 18 (e.g., a 64-bit Armv8 multicore processor array or another multicore array, or another programmable processor), and an interface 20. The network interface controller 14 may include packet processing circuitry 22 (including various units such as a physical layer (PHY) unit and a MAC unit) and a network interface 24. In some embodiments, the data communication device 12 includes a data processing unit (DPU) 26 (also known as a SmartNIC), which includes the network interface controller 14, the processor(s) 18, and the hardware accelerator(s) 16. The hardware accelerator(s) 16 may include any suitable accelerator, for example, networking accelerators, security accelerators, such as regular expression engines, etc.

The network interface controller 14 is configured to process packets received from: a host device 28 for sending over a network 30 to one or more remote device(s) 32; and/or the remote device(s) 32 over the network 30. The packets received from the host device 28 may be received via an interface 36 of the host device 28 and the interface 20 of the data communication device 12. The interface 36 and the interface 20 may be any suitable interface, for example, a peripheral bus interface, such as an interface operating according to peripheral component interconnect express (PCIe) standard.

The network interface 24 is configured to receive packets from the network 30 and send packets over the network 30. The processor(s) 18 may include one or more processing cores configured to execute computer instructions 38 (e.g., software or firmware). The processor(s) 18 is described in more detail with reference to FIG. 2. The hardware accelerator(s) 16 is configured to perform any suitable operation such as encryption, decryption, arithmetic operations, and filtering packets according to filtering rules as described in more detail with reference to FIG. 3. In some embodiments, the packet processing circuitry 22 of the network interface controller 14 is configured to mirror packets (received from the host device 28 or the remote device(s) 32) to the processor(s) 18, which is configured to filter the mirrored packets as described in more detail with reference to FIG. 3.

The system 10 may include another device 34 from which a configuration (e.g., in a configuration file) is received, as described in more detail with reference to FIG. 2. The data communication device 12 may also send formatted data to a device, such as the device 34 (or any suitable device), as described in more detail with reference to FIG. 2. The device 34 may be any suitable processing device, for example, a telemetry device, a device including a graphics processing unit (GPU), and/or a programmable device.

Figure 2:
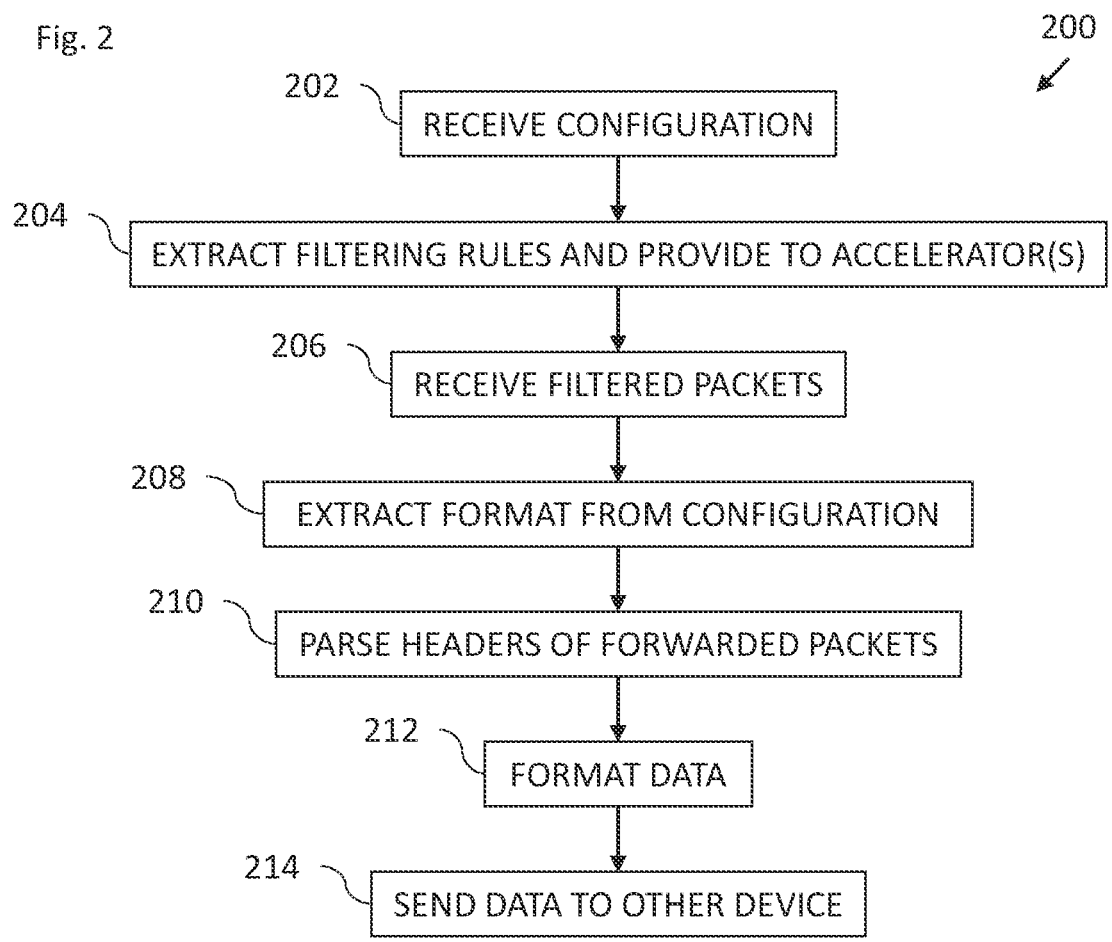
FIG. 2 is a flowchart including steps in a method of operation of one or more processors in the flow inspection system of FIG. 1.

Reference is now made to FIG. 2, which is a flowchart 200 including steps in a method of operation of the processor(s) 18 in the flow inspection system 10 of FIG. 1. As previously mentioned, the processor(s) 18 are configured to execute computer instructions 38 (e.g., of software or firmware).

The computer instructions 38 are configured to receive a configuration (e.g., in a configuration file) from a device such as the device 34 (e.g., a security service) (block 202). The computer instructions 38 are configured to extract filtering rules from the configuration (block 204). The filtering rules may include any suitable filtering rules to identify packets of interest. The filtering rules may include rules related to any one or more of the following: a 5-tuple identification; a tenant identification; a port identification; a user identification; and at least one field from a network header. The extracted filtering rules are provided to the hardware accelerator(s) 16 to filter packets (e.g., packets mirrored to the hardware accelerator(s) 16) according to the filtering rules so that some of the packets are dropped and some of the packets are forwarded back to the computer instructions 38, as described in more detail with reference to FIG. 3.

The computer instructions 38 are configured receive filtered packets forwarded from the hardware accelerator(s) 16 (block 206). In some embodiments, the computer instructions 38 are configured to extract a format from the configuration (block 208). The format specifies how data from the packets should be formatted for sending to the device 34. In some embodiments, the computer instructions 38 are configured to parse headers of the forwarded packets (block 210) for use in the data formatting described in more detail below.

In some embodiments, the computer instructions 38 are configured to format data from the forwarded packets (block 212). In some embodiments, the computer instructions 38 are configured to format data from the forwarded packets based on the extracted format. In some embodiments, the computer instructions 38 are configured to format data from the forwarded packets based on the extracted format and the parsed headers. For example, the extracted format may specify where data from given headers (provided by the header parsing step of block 210) should be included in the formatted data.

The computer instructions 38 are configured to send the (formatted) data to the device 34 (block 214). In some embodiments, the computer instructions 38 are configured to send the (formatted) data to the device 34 over the network 30. In some embodiments, the device 34 may be directly connected to the data communication device 12.

In practice, some or all of the functions of the processor(s) 18 may be combined in a single physical component or, alternatively, implemented using multiple physical components. These physical components may comprise hard-wired or programmable devices, or a combination of the two. In some embodiments, at least some of the functions of the processor(s) 18 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 3:
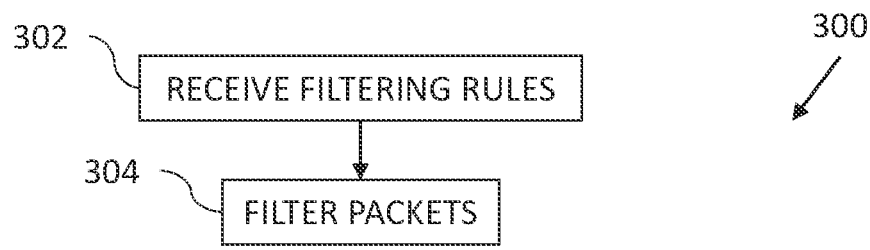
FIG. 3 is a flowchart including steps in a method of operation of one or more accelerators in the flow inspection system of FIG. 1.

Reference is now made to FIG. 3, which is a flowchart 300 including steps in a method of operation of one or more accelerators 16 in the flow inspection system 10 of FIG. 1. The hardware accelerator(s) 16 is configured to: receive the filtering rules from the computer instructions 38 running on the processor(s) 18 (block 302) and load the filtering rules into the hardware accelerator(s) 16; and filter the (mirrored) packets based on the filtering rules so that some of the packets are dropped and some of the packets are forwarded to the computer instructions 38 running on the processor(s) 18 to send data based on the forwarded packets to device 34 (block 304). The hardware accelerator(s) 16 is configured to filter the packets responsively to any suitable filtering rule which may include filtering rules based on one or more of the following: a 5-tuple identification of the packets; a tenant identification of the packets; a port identification of the packets; a user identification of the packets; and at least one field from a network header of the packets.

Figure 4:
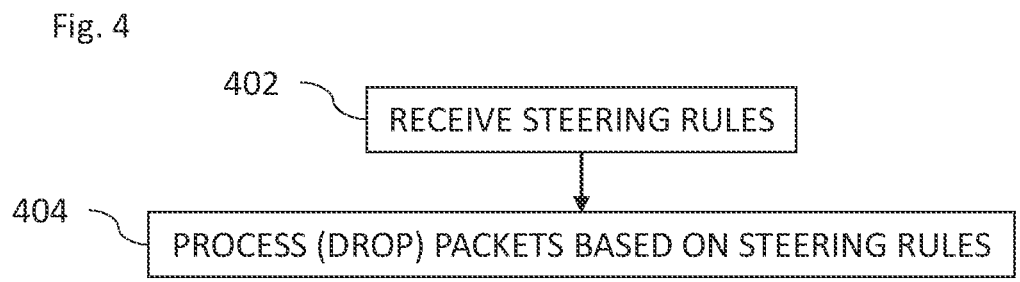
FIG. 4 is a flowchart including steps in a method of operation of a packet processing circuitry in the flow inspection system of FIG. 1.

Reference is now made to FIG. 4, which is a flowchart 400 including steps in a method of operation of the packet processing circuitry 22 in the flow inspection system 10 of FIG. 1.

The device 34 receives the formatted data from the data communication device 12 and may analyze the formatted data and determine a decision based on the received data that certain packets (e.g., from given sources or given packet types etc.) should be dropped or otherwise processed. For example, the device 34 may identify some of the packets as a security threat and determine a decision to drop the identified packets. The device 34 may generate steering rules to be applied by the data communication device 12 to implement the decision.

The packet processing circuitry 22 is configured to: receive steering rules from the device 34 (block 402); and process other packets responsively to the received steering rules (block 404). In some embodiments, the packet processing circuitry 22 is configured to drop at least some of the other packets responsively to the steering rules.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A data communication device, comprising:
a network interface controller to process packets received from at least one of: a host device for sending over a network; and at least one remote device over the network;
at least one processor to execute computer instructions to:
receive a configuration;
extract from the configuration, filtering rules that are used to determine which of the packets are to be dropped and which of the packet are to be forwarded; and
provide the extracted filtering rules to at least one hardware accelerator; and
the at least one hardware accelerator to:
receive the extracted filtering rules from the computer instructions being executed by the at least one processor; and
filter the packets based on the extracted filtering rules so that some of the packets are dropped and some of the packets are forwarded to the at least one processor to send data based on the forwarded packets to another device.

2. The device according to claim 1, further comprising a data processing unit (DPU) including the network interface controller, the at least one processor, and the at least one hardware accelerator.

3. The device according to claim 1, wherein the computer instructions include instructions to:
   extract a format from the configuration;
   format the data based on the extracted format; and
   send the formatted data to the other device.

4. The device according to claim 3, wherein the computer instructions include instructions to:
   parse headers of the forwarded packets; and
   format the data based on the extracted format and the parsed headers.

5. The device according to claim 1, wherein the other device is any one or more of the following: a telemetry device; a device including a graphics processing unit (GPU); and a programmable device.

6. The device according to claim 1, wherein the network interface controller includes packet processing circuitry to:
   receive steering rules from the other device; and
   process other packets responsively to the steering rules.

7. The device according to claim 6, wherein the packet processing circuitry is configured to drop at least some of the other packets responsively to the steering rules.

8. The device according to claim 1, wherein the computer instructions include instructions to send the data to the other device over the network.

9. The device according to claim 1, wherein the network interface controller includes packet processing circuitry to mirror the packets to the software comprising the computer instructions.

10. The device according to claim 1, wherein the at least one hardware accelerator is configured to filter the packets responsively to any one or more of the following: a 5-tuple identification; a tenant identification; a port identification; a user identification; and at least one field from a network header.

11. A flow inspection method, comprising:
    processing packets received from at least one of: a host device for sending over a network; and at least one remote device over the network;
    receiving a configuration;
    extracting from the configuration filtering rules that are used to determine which of the packets are to be dropped and which of the packets are to be forwarded;
    providing the extracted filtering rules to at least one hardware accelerator;
    receiving the extracted filtering rules by the at least one hardware accelerator from computer instructions executed by at least one processor; and
    filtering the packets by the at least one hardware accelerator based on the extracted filtering rules so that some of the packets are dropped and some of the packets are forwarded to at least one processor to send data based on the forwarded packets to another device.

12. The method according to claim 11, further comprising:
    extracting a format from the configuration;
    formatting the data based on the extracted format; and
    sending the formatted data to the other device.

13. The method according to claim 12, further comprising parsing headers of the forwarded packets, wherein the formatting includes formatting the data based on the extracted format and the parsed headers.

14. The method according to claim 11, wherein the other device is any one or more of the following: a telemetry device; a device including a graphics processing unit (GPU); and a programmable device.

15. The method according to claim 11, further comprising:
    receiving steering rules from the other device; and
    processing other packets responsively to the steering rules.

16. The method according to claim 15, further comprising dropping at least some of the other packets responsively to the steering rules.

17. The method according to claim 11, further comprising sending the data to the other device over the network.

18. The method according to claim 11, further comprising mirroring the packets to software.

19. The method according to claim 11, wherein the filtering includes filter packets responsively to any one or more of the following: a 5-tuple identification; a tenant identification; a port identification; a user identification; and at least one field from a network header.

20. The system according to claim 1, wherein the at least one hardware accelerator includes any one or more of the following: a network accelerator; a security accelerator; or a regular expression engine.

21. The method according to claim 11, wherein the at least one hardware accelerator includes any one or more of the following: a network accelerator; a security accelerator; or a regular expression engine.

* * * * *